United States Patent
Nixon et al.

(10) Patent No.: US 6,416,224 B1
(45) Date of Patent: *Jul. 9, 2002

(54) ROLLING CUTTER DRILL BITS

(75) Inventors: Michael S. Nixon; Ranjit Singh, both of Houston; Jeffery E. Daly, Cypress, all of TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 17 days.

This patent is subject to a terminal disclaimer.

(21) Appl. No.: 09/702,507

(22) Filed: Oct. 31, 2000

Related U.S. Application Data

(63) Continuation-in-part of application No. 08/971,504, filed on Nov. 17, 1997, now Pat. No. 6,354,740, which is a continuation of application No. 08/506,993, filed on Jul. 28, 1995, now Pat. No. 5,725,313.

(51) Int. Cl.[7] .............................................. F16C 33/66
(52) U.S. Cl. .............................. 384/93; 384/92; 384/95
(58) Field of Search ............................. 384/92, 93, 94, 384/95, 96, 912, 913

(56) References Cited

U.S. PATENT DOCUMENTS

| 3,235,316 A | 2/1966 | Whanger |
| 3,384,426 A | 5/1968 | Schumacher, Jr. |
| 3,720,274 A | 3/1973 | McCallum |
| 3,721,307 A | 3/1973 | Mayo |
| 4,074,922 A | 2/1978 | Murdock |
| 4,323,284 A | 4/1982 | Childers et al. |
| 4,410,284 A | 10/1983 | Herrick |
| 4,413,918 A | 11/1983 | Thomas |
| 4,439,050 A | 3/1984 | Garner |
| 4,641,976 A | 2/1987 | Kar |
| 4,991,671 A | * 2/1991 | Pearce et al. ............. 384/96 X |
| 5,161,898 A | 11/1992 | Drake |
| 5,628,375 A | * 5/1997 | Daly ......................... 384/93 X |
| 5,725,313 A | * 3/1998 | Singh et al. .................. 384/93 |
| 5,931,241 A | * 8/1999 | Daly ......................... 384/93 X |

OTHER PUBLICATIONS

"Metals Handbook Ninth Edition", vol. 3, Properties and Selection: Stainless Steels, Tool Materials and Special-Purpose Metals. (pp. 257–268 and 589–591) Published by American Society for Metals, Metals Park, Ohio, 1980.

* cited by examiner

Primary Examiner—Pam Rodriguez
(74) Attorney, Agent, or Firm—Jeffery E. Daly

(57) ABSTRACT

A rolling cutter drill bit comprises a body and three legs, each leg having a cantilevered bearing spindle, a roll cutter rotatably mounted on the bearing spindle, a lubricating system within the spindle, and a tubular bearing element located radially between the spindle and the rolling cutter. The tubular bearing element is formed of a wrought alloy material consisting primarily of chromium carbide and cobalt and having a yield strength of less than 120,000 psi and a ductility greater than 4%, both at room temperature, and is of low wall thickness.

20 Claims, 2 Drawing Sheets

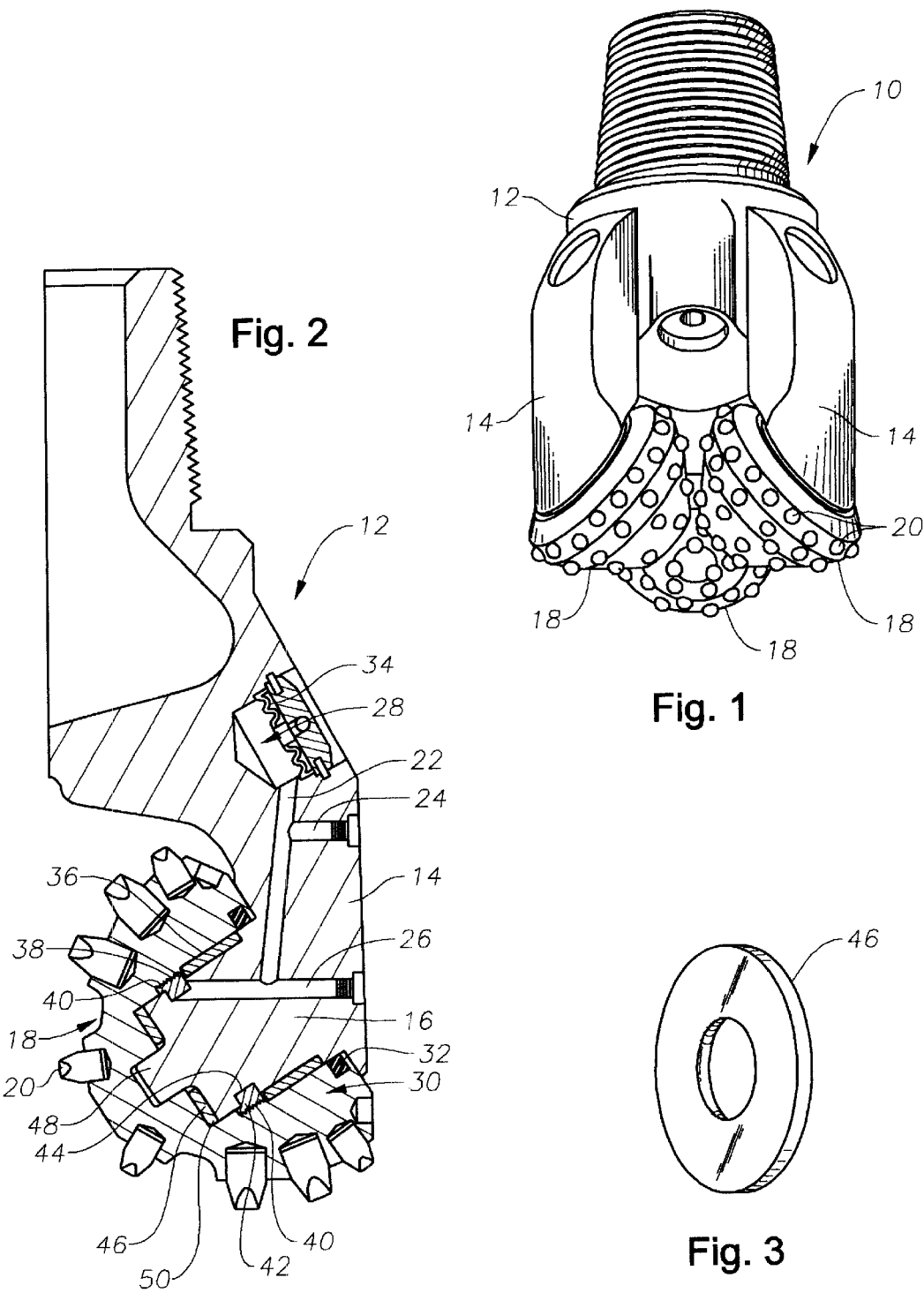

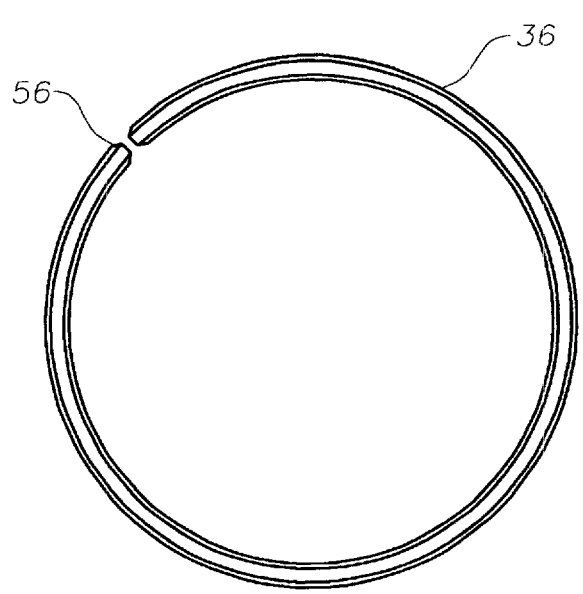
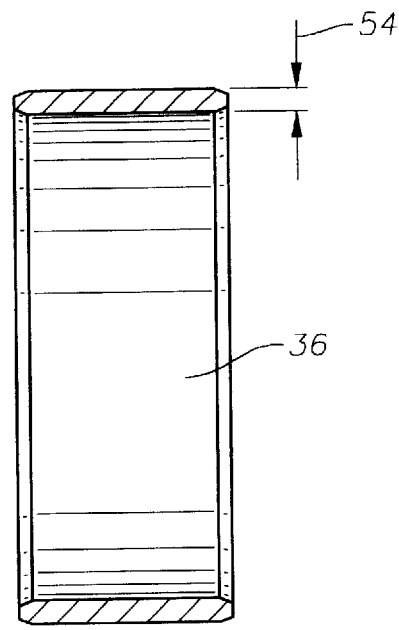
Fig. 4          Fig. 5
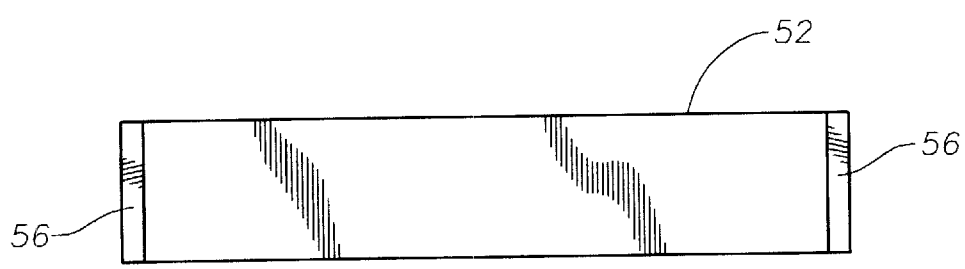
Fig. 6
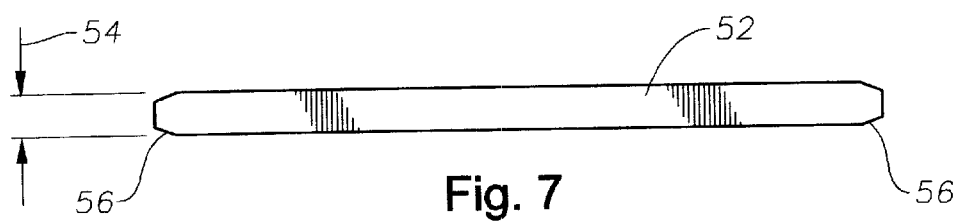
Fig. 7

ROLLING CUTTER DRILL BITS

This application is a Continuation in Part of U.S. patent application Ser. No. 08/971,504, filed Nov. 17, 1997 U.S. Pat. No. 6,354,740, which is a continuation of U.S. patent application Ser. No. 08/506,993, filed Jul. 28, 1995, U.S. Pat. No. 5,725,313.

BACKGROUND OF THE INVENTION

1. Field of the Invention

The present invention relates to the art of earth boring with rolling cutter drill bits. In particular, this invention relates to an improved friction bearing for sealed and lubricated three cone earth boring bits utilized for gas and oil well drilling.

2. Description of Related Art

Sealed and lubricated rolling cutter drill bits (also called rock bits) typically have three different bearing structures in each cutter. The first bearing structure is designed to support cantilevered radial loads and is typically a journal bearing or a roller bearing. The second bearing structure is designed to retain the rolling cutter upon the cantilevered bearing spindle when the cutter is subjected to offward thrust. This retention system is generally comprised of either ball bearings or a friction bearing such as a snap ring or a threaded retaining ring, and it is this bearing structure to which the present invention relates. The third bearing structure is designed to carry onward axial thrust loads and is most often a friction type bearing.

Analysis of used rolling cutter drilling bits shows that when high loads are combined with high rpm, the thrust bearing often fails or the resulting heat build-up causes degradation of the other bearings. Even though a great many designs and materials for rock bit thrust bearings have been used in an attempt to solve this problem, thrust bearing damage still remains a source of bearing failure, especially at very high rpm.

Friction thrust bearing elements in drill bits can be categorized as either fixed or floating bearing elements. Fixed elements are most often welded inlays or interference fitted inserts in the rolling cutter or in the end of the cantilevered bearing spindle. The most commonly used inlay is a STELLITE (registered trademark) material welded on the thrust surface of the cantilevered bearing spindle. Another inlay features alternating surface areas of load bearing and anti-galling materials on the thrust surfaces as shown in U.S. Pat. Nos. 3,235,316 and 4,323,284. Alternately, a tungsten carbide button can be pressed into the cutter as shown in U.S. Pat. No. 3,384,426 or an irregularly shaped disk can be captured in the cutter as shown in U.S. Pat. No. 4,413,918. These materials must be fixed into the rolling cutter or the cantilevered bearing spindle because they lack either strength or ductility or both. For instance, the welded STELLITE and tungsten carbide inserts have less than 1% ductility. If they were not supported by the spindle substrate they would soon disintegrate in service. The ductile inlays have such low hardnesses and yield strengths they would soon wear and/or deform excessively in service.

Drill bit performance is increasingly limited by thrust bearing capability as modern drilling applications demand ever higher loads and speeds. Degradation of thrust bearing surfaces via wear, spalling deformation, and fracture is primarily due to overheating. Significant decreases in both tribological and design strength properties with temperatures are well known to directly cause current materials systems failures.

Floating intermediate thrust bearing elements for drill bits are shown in U.S. Pat. Nos. 3,720,274; 4,410,284; 4,439,050 and 5,161,898. These floating thrust bearing elements have advantages over fixed elements well known and practiced in the prior art.

As shown in U.S. Pat. Nos. 4,439,050 and 5,161,898 and implied in several of the other Patents cited above, floating bearing assemblies can be designed as one or more fixed bearing elements mounted or fused on carriers. The entire assembly functions as a single floating bearing element. These designs are not only more expensive to manufacture and occupy more bearing space than unitary material floating bearing elements in drill bits, they are also not as effective under extreme loads. This is because the bearing material can become separated from the carrier and contaminate the other bearing systems.

The magnitude of temperatures reached in the floating thrust elements of drill bits has been generally under-stated in the prior art. Floating thrust bearing elements in drill bits do not transfer heat into the external environment as easily as the cantilevered bearing spindle or the rolling cutter. Consequently, during a peak load event, the surface temperature of the thrust element will increase preferentially over its mating surfaces within the drill bit. After the load event, the heat will transfer relatively slowly from the thrust element through the mating surfaces and into the surrounding environment. The peak operating surface temperatures at the asperities of the floating thrust element can become extremely high, and in fact can exceed 1500 degree F., leading to failure.

To function successfully in a drill bit, a unitary floating bearing element must have acceptable yield strength and ductility at operating temperature. In U.S. Pat. Nos. 3,721,307, 4,641,976 and 5,161,898, the minimum yield strength for a successful floating bearing element material in a drill bit is established at 140,000 psi and the minimum ductility is established to be about 1% to 4%. The Beryllium Copper of U.S. Pat. No. 3,721,307 is still in common use in drill bits, and is specified in ASTM B643-92, temper TH04 (HT). The minimum yield strength of this material is indicated in that specification to be from 140,000 psi to 155,000 psi. The copper based spinodal material of U.S. Pat. No. 4,641,976 with an ultimate tensile strength of 180,000 psi typically has minimum yield strength of from 145,000 psi to 160,000 psi. Quoting U.S. Pat. No. 5,161,898 (Col. 1, line 47),". . . materials having minimum yield strengths of about 140,000 psi are needed to avoid macroscopic plastic deformation in service." It is understood that all these yield strength values are at room temperature. It is apparent in the prior art that 140,000 psi is common as the minimum room temperature yield strength for floating bearing elements in drill bits.

The copper based alloys of U.S. Pat. Nos. 3,721,307 and 4,641,976 mentioned above have a weakness; however, when the operating temperatures reach about 600 degree F. their strength greatly decreases. Generally, yield strengths of these copper alloys approach zero psi at 1500 degree F.

Historically, failure analysis of drill bit bearings has led bit designers to develop bearing materials with ever higher yield strengths. However, these materials probably performed better not because their room temperature yield strengths were higher, but because raising the room temperature yield strength tended to increase the operating temperature yield strengths. This success, coupled with the ease of measurement at room temperature, has led to a search for materials having high yield strength and good ductility at room temperature. Little attention has been given to materials with lower room temperature yield strength, but relatively high yield strength at operating temperature.

The friction bearing typically takes the form of a beryllium copper split tube surrounding part of the spindle, the bearing being located within a chamber, defined between the spindle and the rolling cutter, appropriate seal arrangements being provided to restrict the ingress of well fluid into the chamber and the egress of lubricant from the chamber. There is a tendency for the rolling cutter to reciprocate, axially, on the spindle, in use. As a result, the fluid pressure within the chamber varies significantly. Attempts have been made to stabilize the chamber pressure, for example by connecting the chamber to a reservoir divided by a flexible diaphragm which is movable to vary the volume of the part of the reservoir connected to the chamber, thereby absorbing pressure fluctuations. The movement of the rolling cutter is sufficiently fast that such a technique does not adequately stabilize the fluid pressure. As a result, leakage of fluid past the seals occurs. The ingress of fluids may result in particulate matter entering the chamber and this may result in increased levels of wear.

SUMMARY OF THE PRESENT INVENTION

The present invention is directed at a new friction bearing element for rolling cutter rock drill bits formed of a material selected from the class of materials formed primarily of cobalt and chromium carbide and known as wrought, ductile STELLITES. One material of this class is Aerospace Material Specification AMS 5894, a cobalt based, wrought super alloy commercially available by the trade name STELLITE, grade 6B, from Del Oro Stellite, Ontario, Canada. Friction bearings made from this STELLITE material with a room temperature yield strength averaging 105,000 psi have been successfully field tested in multiple drilling environments.

The use of a friction bearing constructed from such a material is advantageous in that the bearing can be of reduced thickness compared to typical bearings. The reduction in the thickness of the bearing permits the chamber between the spindle and the rolling cutter to be of reduced dimensions. As described hereinbefore, the rolling cutter tends to reciprocate, acting like a piston, but by reducing the dimensions of the chamber the "swept area" of the piston-like motion of the rolling cutter can be reduced and this, in turn, can reduce the magnitude of the pressure fluctuations and the risk of leakage past the seals.

The invention provides a rolling cutter drill bit with a friction bearing element of tubular form made of ductile STELLITE having a room temperature tensile elongation greater than 4% and a room temperature yield strength less than 120,000 psi.

The invention also provides a rolling cutter drill bit where the friction bearing element is of tubular form and has a wall thickness of less than 0.05 inch. The wall thickness is preferably greater than about 0.015 inch. Preferably the wall thickness falls within the range 0.02 inch to 0.04 inch, the wall thickness conveniently being about 0.03 inch.

The friction bearing element is preferably provided with a coating of a relatively soft material. The relatively soft material may comprise silver.

The invention further provides a rolling cutter drill bit with a tubular friction bearing element made of ductile STELLITE with a room temperature yield strength less than 120,000 psi, said material further having a yield strength greater than 30,000 psi, an un-notched longitudinal Charpy impact toughness of greater than 120 ft-lbs., and a tensile elongation greater than 10%, all at 1500 degrees F.

The invention still further provides a rolling cutter drill bit with a tubular friction bearing element made of a ductile, wrought STELLITE material.

The invention still further provides a rolling cutter drill bit with a tubular friction bearing element made of a ductile, wrought STELLITE with a room temperature yield strength less than 120,000 psi, and coated with a soft, metallic solid lubricant.

BRIEF DESCRIPTION OF THE DRAWINGS

FIG. 1 is a perspective view of a rolling cutter bit according to an embodiment of the present invention.

FIG. 2 is a cross sectional view of the preferred embodiment of an earth boring bit of the present invention showing the general arrangement of the lubrication and bearing systems.

FIG. 3 is a perspective view of a thrust washer of the bit illustrated in FIG. 2.

FIG. 4 is a plan view of a tubular friction bearing element of the bit illustrated in FIG. 2.

FIG. 5 is a sectional view of the tubular friction bearing element of FIG. 4.

FIG. 6 and FIG. 7 are views illustrating the material from which the tubular friction bearing element is constructed.

DETAILED DESCRIPTION OF THE PREFERRED EMBODIMENTS

Referring now to the drawings in more detail, and particularly to FIGS. 1 and 2, a rolling cutter drill bit 10 includes a body 12 (portions of which are not shown). The body 12 of a typical rolling cutter drill bit comprises three similar leg portions 14 (only two are shown). A cantilevered bearing spindle 16 formed on each leg 14 extends inwardly and downwardly. A rolling cutter 18 is rotatably mounted upon the spindle 16 as hereinafter explained. Attached to the rolling cutter 18 are cutting inserts 20 which engage the earth to effect a drilling action and cause rotation of the rolling cutter 18.

Typically, each cutting insert 20 is formed of a hard, wear resistant material. Internal passageways 22, 24, & 26, as well as a reservoir 28 and bearing area 30 of the leg 14, are filled with lubricant (not shown) during bit assembly. The lubricant helps reduce bearing friction and wear during bit operation and is retained within the cutter 18 by a dynamic seal 32. Pressure differentials between the lubricant and the external environment of the bit are equalized by the movement of a pressure balancing diaphragm 34.

The cutter 18 is mounted upon the cantilevered bearing spindle 16 formed on the leg 14. A sliding friction bearing element 36 of the present invention is mounted between the spindle 16 and a mating bearing cavity 38 formed in the cutter 18. This bearing element 36 is designed to carry the radial loads imposed upon the cutter 18 during drilling.

The friction bearing element 36 must withstand the impact loading present in rock bits during severe service at all temperatures. The friction bearing element 36 must also have very high hot hardness, toughness, good ductility and the ability to resist wear in the presence of abrasives. At room temperature, the friction bearing element 36 material may have a minimum yield strength of around 80,000 psi, good impact strength, a ductility of at least 4%, and good abrasion resistance. The friction bearing element 36 is formed of a ductile STELLITE material with these properties which make it a superior drill bit 10 friction bearing element 36.

A second bearing member 42 is configured as a split threaded ring which engages internal threads 40 in the bearing cavity 38 of the cutter. This second bearing member 42 serves to retain the cutter 18 upon the bearing spindle by resisting the forces which tend to push the cutter 18 inward during drilling.

A third bearing member 46 is disposed between the bearing spindle 16 and the cutter 18. This bearing member 46 carries the onward thrust forces imposed upon the cutter 18 during drilling, and is hereinafter referred to as a thrust washer. In operation this thrust washer floats in the space between the bearing spindle 16 and the cutter 18.

The thrust washer 46 must also withstand the impact loading present in rock bits during severe service at all temperatures. The thrust washer 46 must also have very high hot hardness, toughness, good ductility and the ability to resist wear in the presence of abrasives. At room temperature, the thrust washer 46 material may have a minimum yield strength of around 80,000 psi, good impact strength, a ductility of at least 4%, and good abrasion resistance. The thrust washer 46 is formed of a ductile STELLITE material with these properties which make it a superior rock bit 10 floating thrust bearing.

A further property of ductile STELLITES is their reaction to wear particles. Because ductile STELLITES tend to have extremely large and hard chromium carbide precipitates in a ductile cobalt matrix, they have the ability to entrain wear particles in the matrix. Silica particles up to 0.001" diameter have been found embedded in the ductile cobalt matrix of thrust washers 46 of this invention from bits tested in field drilling operations. The silica particles were fine drilled solids from the wellbore which entered the bearing area 30 past the seal 32. The ability to entrain these wear particles may be beneficial when drill bits are operating in an abrasive environment.

In the preferred embodiment of the present invention, the friction bearing element 36 is made of a ductile STELLITE material with a room temperature yield strength of between 80,000 psi and 120,000 psi, a tensile elongation greater than 5%, and an un-notched longitudinal Charpy impact strength greater than 60 ft-lbs. at room temperature. This wrought chromium carbide and cobalt containing material typically has a minimum yield strength of less than 100,000 psi at room temperature.

The same friction bearing element 36 has an un-notched longitudinal Charpy impact strength of greater than 120 ft-lbs., a yield strength greater than 30,000 psi, and a tensile elongation greater than 10% at 1500 degrees F. Bearing surface asperity temperatures of 1500 degrees F. can occur in a rock bit drilling in a severe application.

A friction bearing element 36 made of ductile STELLITE material provides superior performance when run in these extreme conditions, when prior art drill bit thrust systems fail. In the preferred embodiment, the thrust washer 46 is made from Aerospace Material Specification AMS 5894, commercially available as grade 6B wrought STELLITE from Del Oro STELLITE, Ontario, Canada. Several hundred drill bits have been satisfactorily tested with friction bearing element 36 made with this material.

Ductile STELLITE material is well known as a bearing material with a relatively low room temperature yield strength. For example, in the Metals Handbook, ninth edition, volume 3, "Properties of Cobalt-Base Superalloys", pages 257–268, 1980, this type of material typically has room temperature yield strengths of 100 ksi and lower. As previously described, the established wisdom in the drill bit industry required that the minimum room temperature yield strength for bearing materials to be greater than 140 ksi. The ability of these ductile STELLITE materials to work harden in service combined with the desirable high temperature properties of this STELLITE material allow this material to nonetheless perform well as a bearing in a drill bit 10.

Although a variety of diameters and thicknesses of the thrust washer 46 were tested with equal effectiveness, a thickness of 0.070" proved to be optimum when manufacturing ease, design space, fit and strength are considered. To assure proper fit, both surfaces of the thrust washer were finished to within 0.0005" parallelism and 0.0005" flatness. The surface finish of the floating washer can be smooth or rough as desired, although it is desirable to have an initial roughness of about 10 micro-inches Ra.

It is also desired that the diametric clearance between the outside diameter of the thrust washer 46 and the mating cavity 50 in the cutter 18 be less than the diametric clearance between the inside diameter of the thrust washer 46 and the pin 48 of the bearing spindle 16. This OD trapping of the washer 46 in the cutter 18 causes the thrust washer 46 to lock within the cutter 18 during extreme load peaks. During these load events, degradation of the thrust washer 46 is minimized because once it locks into the cutter 18, it rotates with the cutter 18, spreading the load over a greater portion of the surface of the thrust washer 46. When the peak load event is over, the thrust washer 46 returns to normal floating operation.

In accordance with the invention, the sliding friction bearing element 36 is of split tubular form, as shown most clearly in FIGS. 4 and 5. As described hereinbefore, cutter 18 tends to perform a reciprocating motion, in use, the cutter 18 and spindle 16 acting as a piston and causing pressure fluctuations in the lubricant located within the cutter 18. In order to minimize these pressure fluctuations it is desirable to reduce the size of the swept area. In order to reduce the size of the swept area the bearing element 36 is of small wall thickness 54. The wall thickness 54 is preferably less than 0.05 inch and is conveniently greater than 0.015 inch. If the wall thickness 54 is less than about 0.015 inch, then production of the bearing elements 36 may be complex. Further, the ability of the bearing elements 36 to withstand axial loads without undergoing deformation due to the misalignment of the ends 56 thereof may be impaired. Even for elements 36 having a wall thickness 54 of at least 0.015 inch, it may be necessary to shape the ends of the member forming the element 36 to include inter-engaging formations to restrict misalignment thereof.

Although the bearing element 36 may be of very small wall thickness 54 for example about 0.02 inch, in the preferred embodiment the wall thickness 54 is about 0.03 inch.

In order to be of low wall thickness 54 and of sufficient strength to withstand the loads applied thereto, the bearing element 36 is conveniently formed of a ductile STELLITE material, preferably the same material as that used in the formation of the thrust washer 46.

As illustrated in FIGS. 6 and 7, the bearing element 36 is formed from a STELLITE member 52 of thickness approximately 0.03 inch, width approximately 0.625 inch and length approximately 6.4 inches. The ends 56 of the member 52 are conveniently of slightly tapered form. The member 52 is bent around a suitable mandrel to form a split tube of height or axial length approximately 0.625 inch and inner diameter approximately 2.025 inches, the tapered ends 56 of the member 52 being spaced apart from one another in the finished bearing element 36 by a distance of about 0.03 inch. Such a bearing element 36 will have a wall thickness 54 of about 0.03 inch.

STELLITES in general tend to have higher coefficients of friction against steels than other bearing materials. To compensate for this, the ductile STELLITE bearing material may be coated with a soft metallic solid lubricant. Many types of lubricants are suitable and include lead, indium, silver, gold, copper and alloys thereof These lubricants can be applied to the STELLITE in a variety of ways including welding, plating, ion bombardment, D-gun, hot dipping, etc. In the preferred embodiment, a 0.0005" to 0.0015" thick silver layer is electroplated onto the surface of the ductile STELLITE thrust washer 46 to provide this solid lubrication, and a silver layer of thickness at least 0.0008" is applied to both the inner and outer surfaces of the bearing element 36.

Whereas the present invention has been described in particular relation to the drawings attached hereto, it should be understood that other and further modifications, apart from those shown or suggested herein, may be made within the scope and spirit of the present invention.

What is claimed is:

1. A rolling cutter drill bit comprising a body and a plurality of legs, at least one of said legs having a cantilevered bearing spindle, a rolling cutter rotatably mounted on the bearing spindle, lubricant delivering means within the bearing spindle, and a tubular bearing element located radially between the spindle and the rolling cutter, the tubular bearing element being formed of a wrought alloy material consisting primarily of chromium carbide and cobalt and having a yield strength of less than 120,000 psi and a ductility greater than 4%, both at room temperature.

2. A drill bit according to claim 1, wherein said tubular bearing element has load carrying surfaces at least one of which is coated with one or more layers of soft metallic solid lubricant material.

3. A drill bit according to claim 2, wherein said soft metallic solid lubricant material is selected from the group of lead, indium, silver, gold, copper and alloys thereof.

4. A drill bit according to claim 3, wherein said load carrying surfaces of the tubular bearing element are electroplated with a 0.0005" to 0.0015" thick layer of a silver solid lubricant material.

5. A drill bit according to claim 1, wherein said tubular bearing element has a wall thickness of less than about 0.05".

6. A drill bit according to claim 5, wherein the wall thickness is greater than about 0.015".

7. A drill bit according to claim 6 wherein the wall thickness falls within the range 0.02 to 0.04".

8. A drill bit according to claim 7 wherein the wall thickness is about 0.03".

9. A drill bit according to claim 1, wherein said lubricant delivering means comprise lubricant filled internal passageways within the bearing spindle, said passageways being in communication with a lubricant reservoir having a pressure balancing diaphragm.

10. A rolling according to claim 1, wherein the bearing element is of split tubular form.

11. A rolling cutter drill bit comprising a body and a plurality of legs, at least one of said legs having a cantilevered bearing spindle, a rolling cutter rotatably mounted on the bearing spindle, lubricant delivering means within the bearing spindle, and a separate bearing element configured to carry loads between the rolling cutter and said bearing spindle, said bearing element being formed of a wrought alloy material consisting primarily of chromium carbide and cobalt and having a yield strength of less than 120,000 psi and a ductility greater than 4%, both at room temperature.

12. A drill bit according to claim 11, wherein the yield strength of said separate bearing element is less than 100,000 psi at room temperature.

13. A drill bit according to claim 11, wherein the yield strength of said separate bearing element lies in the range of 80,000 to 120,000 psi at room temperature.

14. A drill bit according to claim 11, wherein the yield strength of said separate bearing element is about 105,000 psi at room temperature.

15. A drill bit according to claim 11, wherein the yield strength of said separate bearing element is about 80,000 psi at room temperature.

16. A drill bit according to claim 11, wherein said separate bearing element has a yield strength greater than about 30,000 psi at 1500 degrees F.

17. A drill bit according to claim 11, wherein said separate bearing element has a tensile elongation greater than 10% at 1500 degrees F.

18. A drill bit according to claim 11, wherein said separated bearing element has an un-notched Charpy impact strength greater than 120 ft-lbs. at 1500 degrees F.

19. A drill bit according to claim 11, wherein said separate bearing element has an un-notched Charpy impact strength greater than 60 ft-lbs. at room temperature.

20. A drill bit according to claim 11, wherein the separate bearing element is formed from a material in accordance with Aerospace Material Specification AMS 5894.

* * * * *